(12) United States Patent
Deng (10) Patent No.: US 9,220,068 B2
(45) Date of Patent: Dec. 22, 2015

(54) POWER SAVING METHOD, APPARATUS AND COMMUNICATION TERMINAL

(71) Applicant: Huawei Device Co., Ltd., Shenzhen (CN)

(72) Inventor: Yu Deng, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/311,064

(22) Filed: Jun. 20, 2014

(65) Prior Publication Data

US 2014/0302839 A1 Oct. 9, 2014

Related U.S. Application Data

(63) Continuation of application No. PCT/CN2012/087049, filed on Dec. 20, 2012.

(30) Foreign Application Priority Data

Dec. 23, 2011 (CN) .......................... 2011 1 0437642

(51) Int. Cl.
*H04M 3/00* (2006.01)
*H04W 52/02* (2009.01)

(52) U.S. Cl.
CPC ...... *H04W 52/0258* (2013.01); *H04W 52/0216* (2013.01); *H04W 52/0251* (2013.01); *H04W 52/0248* (2013.01); *Y02B 60/50* (2013.01)

(58) Field of Classification Search
CPC ............... H04M 2250/10; H04M 2250/52; H04M 1/67; H04M 1/72566; H04W 52/0235; H04W 52/0216; H04W 52/0254; H04W 88/02; H04W 24/00; H04W 52/0251; H04W 52/028; H04W 52/0261; H04W 52/0274; H04W 56/00
USPC .......................................................... 455/418
See application file for complete search history.

(56) References Cited

U.S. PATENT DOCUMENTS 7,254,721 B1 8/2007 Tobias et al.
2006/0019723 A1 1/2006 Vorenkamp et al.
(Continued)

FOREIGN PATENT DOCUMENTS

CN 1462122 A 12/2003
CN 101084648 A 12/2007
(Continued)

OTHER PUBLICATIONS

Partial English Translation and Abstract of Chinese Patent Application No. CN102111730A, Part 1, Jul. 31, 2014, 6 pages.
(Continued)

*Primary Examiner* — Kwasi Karikari
(74) *Attorney, Agent, or Firm* — Conley Rose, P.C.; Grant Rodolph; Adam J. Stegge (57) ABSTRACT

A power saving method, apparatus and communication terminal are provided to reduce power consumption of a communication terminal and prolong standby time by reducing the number of wakeup times of the communication terminal in a standby state. The method includes: acquiring use time of each function of a communication terminal in one sampling cycle; executing a statistical algorithm on the use time of each function of the communication terminal to separately obtain a duration of frequent use of each function of the communication terminal in the sampling cycle; and correspondingly activating each function of the communication terminal in the duration of frequent use of each function. Embodiments of the present invention are used for power saving of the communication terminal and relate to the field of wireless communication.

20 Claims, 5 Drawing Sheets

(56) References Cited

U.S. PATENT DOCUMENTS

| | | | |
|---|---|---|---|
| 2006/0083168 A1 | 4/2006 | Prakash | |
| 2008/0214249 A1* | 9/2008 | Kim et al. | 455/574 |
| 2009/0218957 A1* | 9/2009 | Kraft et al. | 315/291 |
| 2011/0177847 A1* | 7/2011 | Huang | 455/574 |
| 2012/0015695 A1* | 1/2012 | Hackborn et al. | 455/566 |

FOREIGN PATENT DOCUMENTS

| | | | |
|---|---|---|---|
| CN | 101815283 A | 8/2010 | |
| CN | 102111730 A | 6/2011 | |
| CN | 102137192 A | 7/2011 | |
| CN | 102547936 A | 7/2012 | |
| JP | 2000261364 A | 9/2000 | |
| JP | 2007034709 A | 2/2007 | |

OTHER PUBLICATIONS

Partial English Translation and Abstract of Chinese Patent Application No. CN102111730A, Part 2, Jul. 31, 2014, 3 pages.

Partial English Translation and Abstract of Chinese Patent Application No. CN101815283A, Part 1, Jul. 31, 2014, 12 pages.

Partial English Translation and Abstract of Chinese Patent Application No. CN101815283A, Part 2, Jul. 31, 2014, 4 pages.

Partial English Translation and Abstract of Chinese Patent Application No. CN102137192A, Part 1, Jul. 31, 2014, 11 pages.

Partial English Translation and Abstract of Chinese Patent Application No. CN102137192A, Part 2, Jul. 31, 2014, 4 pages.

"3rd Generation Partnership Project; Technical Specification Group Radio Access Network; User Equipment (UE) procedures in ide mode and all procedures for cell reselection in connected mode," Release 10, 3GPP TS 25.304, V10.1.0, Jun. 2011, 52 pages.

Foreign Communication of a Counterpart Application, PCT Application No. PCT/CN2012/087049, English Translation of International Search Report dated Mar. 28, 2013, 2 pages.

Foreign Communication of a Counterpart Application, PCT Application No. PCT/CN2012/087049, English Translation of Written Opinion dated Mar. 28, 2013, 10 pages.

Foreign Communication From a Counterpart Application, European Application No. 12860548.2, Extended European Search Report dated Apr. 13, 2015, 6 pages.

Partial English Translation and Abstract of Japanese Patent Application No. JP2000261364A, Part 1, Jun. 29, 2015, 2 pages.

Partial English Translation and Abstract of Japanese Patent Application No. JP2000261364A, Part 2, Jun. 29, 2015, 7 pages.

Partial English Translation and Abstract of Japanese Patent Application No. JP2007034709A, Part 1, Jun. 29, 2015, 3 pages.

Partial English Translation and Abstract of Japanese Patent Application No. JP2007034709A, Part 2, Jun. 29, 2015, 15 pages.

Foreign Communication From a Counterpart Application, Chinese Application No. 2014547700, Chinese Office Action dated May 19, 2015, 4 pages.

Foreign Communication From a Counterpart Application, Chinese Application No. 2014547700, English Translation of Chinese Office Action dated May 19, 2015, 3 pages.

* cited by examiner

POWER SAVING METHOD, APPARATUS AND COMMUNICATION TERMINAL

CROSS-REFERENCE TO RELATED APPLICATIONS

This application is a continuation of International Application No. PCT/CN2012/087049, filed on Dec. 20, 2012, which claims priority to Chinese Patent Application No. 201110437642.4, filed on Dec. 23, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of wireless communication, and in particular, to a power saving method, apparatus and communication terminal.

BACKGROUND

Since the introduction of smart phones, standby power consumption is always a problem. Because a smart phone in a standby state not only needs to complete routine tasks such as monitoring paging channels, detecting serving cell power and searching for neighboring cells, but also needs to take care of tasks such as data service synchronization and maintenance of data link heartbeats, the standby power consumption rises violently, greatly affecting standby time of the smart phone. Meanwhile, because most of real-time functions of the smart phone need to be supported by a data service network, in the standby state, link heartbeat packets consume massive wireless channel resources of a base station, and in a worse case, may even cause breakdown of the base station. Because only a very small part of the foregoing functions is actually significant for a smart phone user, the smart phone is always in a state with all the functions activated anytime and anywhere.

To solve the foregoing technical problem, a common technology used at present is discontinuous reception (DRX), that is, the smart phone stops monitoring a wireless communication channel and enters a sleep state within a period of time, and is waked up only every certain specific time interval, so as to reduce standby power consumption. Specifically, a time interval for waking up the smart phone is notified in a cell broadcast of the base station, and in other time, the smart phone may enter a sleep state.

However, in a process of implementing the foregoing DRX technology, an inventor finds that in addition to DRX wakeup, data service synchronization may also wake up the smart phone, which causes an increase in a standby current; and moreover, the DRX technology implements wakeup at a fixed cycle, and the smart phone may also be waked up even when the smart phone is not in use, which increases power consumption of the smart phone.

SUMMARY

Embodiments of the present invention provide a power saving method, apparatus and communication terminal, which reduces power consumption of a communication terminal and prolongs standby time by reducing the number of wakeup times of the communication terminal in a standby state.

To achieve the foregoing objectives, embodiments of the present invention adopt the following technical solutions:

According to an aspect, a power saving method is provided and includes: acquiring use time of each function of a communication terminal in one sampling cycle; executing a statistical algorithm on the use time of each function of the communication terminal to separately obtain a duration of frequent use of each function of the communication terminal in the sampling cycle; and correspondingly activating each function of the communication terminal in the duration of frequent use of each function.

According to another aspect, a power saving apparatus is provided and includes: an acquiring unit configured to acquire use time of each function of a communication terminal in one sampling cycle; a statistics unit configured to execute a statistical algorithm on the use time of each function of the communication terminal to separately obtain a duration of frequent use of each function of the communication terminal in the cycle; and a control unit configured to correspondingly activate each function of the communication terminal in the duration of frequent use of each function.

According to another aspect, a communication terminal is provided and includes: a power supply module, a storage, a central processing unit (CPU), an input/output (I/O) processing module, a radio frequency module, an application program module and a power saving apparatus, where the power saving apparatus is specifically configured to: acquire use time of each functional module in the application program module of the communication terminal in one sampling cycle; execute a statistical algorithm on the use time of each functional module of the communication terminal to separately obtain a duration of frequent use of each function of the communication terminal in the sampling cycle; and correspondingly activate each function of the communication terminal in the duration of frequent use of each function.

Embodiments of the present invention provide a power saving method, apparatus and communication terminal. Use time of each function of a communication terminal in one sampling cycle is acquired; a statistical algorithm is executed on the use time of each function of the communication terminal to separately obtain a duration of frequent use of each function of the communication terminal in the sampling cycle; and each function of the communication terminal is correspondingly activated in the duration of frequent use of each function. In this way, the communication terminal activates each corresponding function only in the duration of frequent use of each function, thereby reducing the number of wakeup times of the communication terminal in a standby state, reducing power consumption of the communication terminal, and prolonging standby time.

BRIEF DESCRIPTION OF THE DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
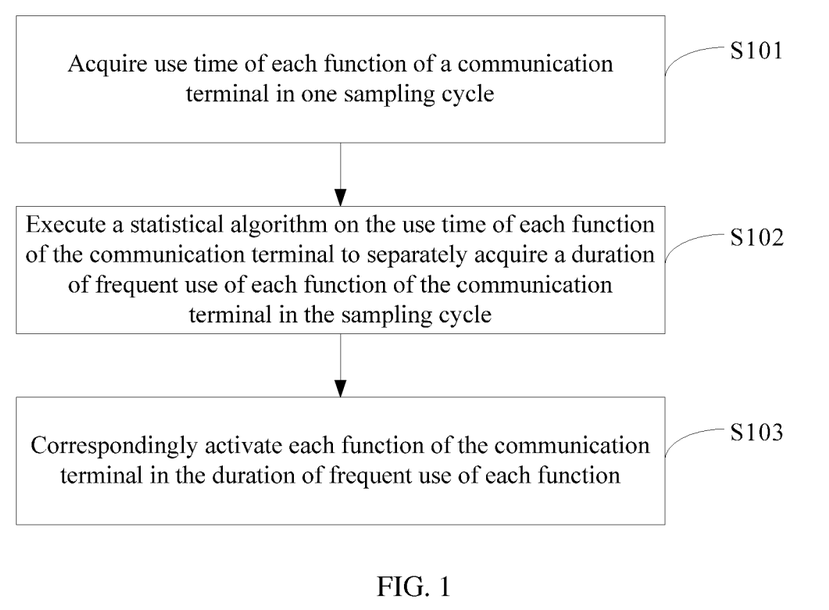
FIG. 1 is a flowchart of a power saving method according to Embodiment 1 of the present invention.

As shown in FIG. 1, the embodiment of the present invention provides a power saving method, including:

S101. Acquire use time of each function of a communication terminal in one sampling cycle.

Specifically, the sampling cycle may be 10 to 60 days, and preferably, 10 days. Functions of the communication terminal include a short message function, a telephone function, a communication terminal screen off function, a web search function, a power detection function, and a data service function. The data service function refers to an Internet access function, a mailbox function, a video function, and a General Packet Radio Service (GPRS) function.

It should be noted that these functions are used in description of this embodiment, but functions of the communication terminal are not limited to these functions in an actual application.

S102. Execute a statistical algorithm on the use time of each function of the communication terminal to separately obtain a duration of frequent use of each function of the communication terminal in the sampling cycle.

Figure 2:
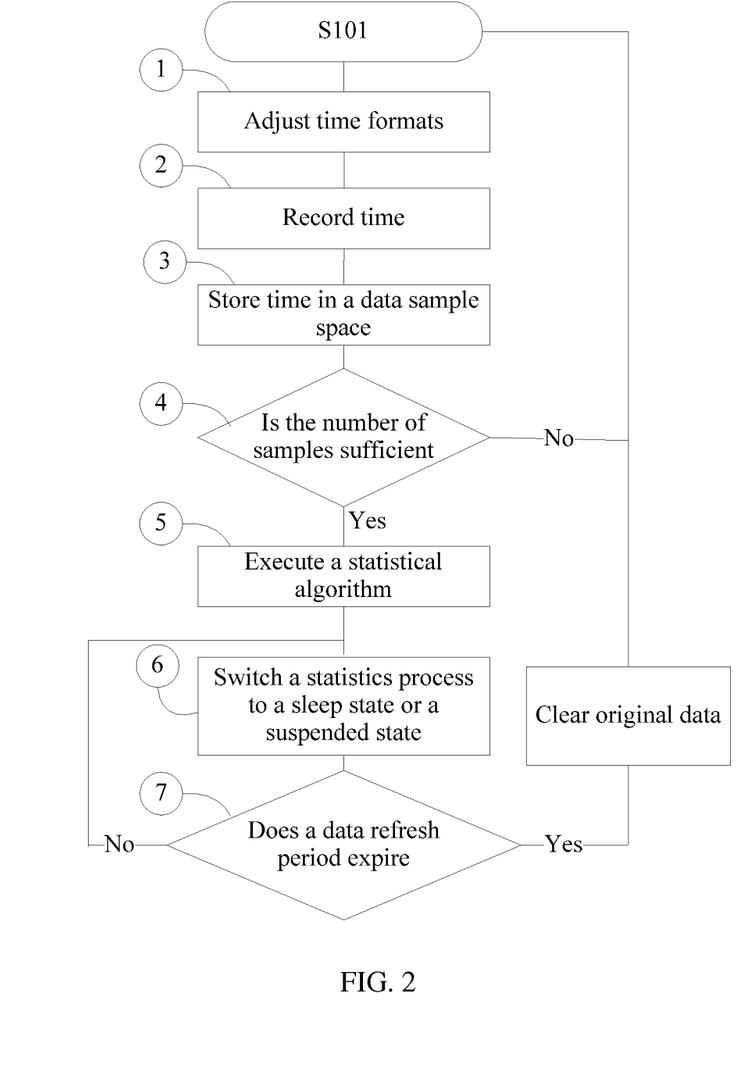
FIG. 2 is a flowchart of a sampling method according to Embodiment 1 of the present invention.

Specifically, a process of executing the statistical algorithm on the use time of each function of the communication terminal is shown in FIG. 2.

(1) Adjust time formats. Because the acquired use time of each function is from each functional software module interface and is different in format, it is necessary to perform format adjustment for the use time of each function of the communication terminal, so as to facilitate analysis and processing.

(2) Record time. Sketch values are extracted from time data with a same format, and use time of a same sketch value is recorded, where the sketch value is used to identify each function of the communication terminal.

(3) Store the recorded time in a data sample space, where the sample space refers to a nonvolatile memory.

(4) Determine whether sample data in the sample space is sufficient. If yes, execute a number-of-times statistical algorithm on the sample data; and if no, continue to acquire the use time of each function of the communication terminal.

(5) Execute the number-of-times statistical algorithm. Specifically, the short message function is used for description, where the sampling cycle is 10 days, as shown in Table 1.

TABLE 1

| | | Time Range | | | | | | | | | | | | |
|---|---|---|---|---|---|---|---|---|---|---|---|---|---|---|
| | | 0:00 | 2:00 | 4:00 | 6:00 | 8:00 | 10:00 | 12:00 | 14:00 | 16:00 | 18:00 | 20:00 | 22:00 | 0:00 |
| Short message service | day.1 | 0 | 0 | 0 | 0 | 2 | 0 | 5 | 0 | 0 | 3 | 1 | 0 | 0 |
| | day.2 | 0 | 0 | 0 | 0 | 2 | 0 | 6 | 0 | 0 | 4 | 0 | 0 | 0 |
| | day.3 | 0 | 1 | 0 | 0 | 3 | 0 | 3 | 0 | 0 | 3 | 5 | 0 | 1 |
| | day.4 | 0 | 0 | 0 | 0 | 0 | 0 | 4 | 0 | 0 | 5 | 3 | 0 | 0 |
| | day.5 | 0 | 0 | 0 | 0 | 1 | 0 | 7 | 1 | 0 | 2 | 0 | 1 | 0 |
| | day.6 | 0 | 0 | 0 | 0 | 0 | 0 | 2 | 0 | 0 | 4 | 5 | 0 | 2 |
| | day.7 | 0 | 0 | 0 | 0 | 3 | 1 | 5 | 2 | 2 | 3 | 6 | 0 | 0 |
| | day.8 | 0 | 0 | 0 | 0 | 2 | 0 | 6 | 0 | 0 | 0 | 4 | 0 | 0 |
| | day.9 | 0 | 0 | 0 | 0 | 1 | 0 | 3 | 0 | 0 | 1 | 1 | 0 | 0 |
| | day.10 | 0 | 0 | 0 | 0 | 4 | 0 | 4 | 0 | 0 | 2 | 0 | 0 | 0 |
| | Average | 0 | 0.1 | 0 | 0 | 1.8 | 0.1 | 4.5 | 0.3 | 0.2 | 2.7 | 2.5 | 0.1 | 0.3 |

(a) Firstly, divide time into 12 ranges: 0:00-2:00 (corresponding to 2:00 in the table), 2:00-4:00 (corresponding to 4:00 in the table), 4:00-6:00 (corresponding to 6:00 in the table), 6:00-8:00 (corresponding to 8:00 in the table), 8:00-10:00 (corresponding to 10:00 in the table), 10:00-12:00 (corresponding to 12:00 in the table), 12:00-14:00 (corresponding to 14:00 in the table), 14:00-16:00 (corresponding to 16:00 in the table), 16:00-18:00 (corresponding to 18:00 in the table), 18:00-20:00 (corresponding to 20:00 in the table), 20:00-22:00 (corresponding to 22:00 in the table), and 22:00-24:00 (corresponding to 0:00 in the table).

(b) Count the number of use times of a short message function in each range in one day according to use time of the short message function stored in the sample space, and collect the statistics over a total of 10 days.

(c) Average the number of use times of the short message function in each range within 10 days and select 3 ranges with a maximum average value as periods of frequent use of the short message function.

(6) Switch a statistics process to a sleep state or a suspended state.

Preferably, statistical data may be re-acquired by updating sample data according to different functions of the communication terminal which are frequently used by a user in different periods. Therefore, the statistics process may further include:

(7) Determine whether a data refresh period expires. If yes, clear original data in the sample space and execute S101 again; and if no, switch the statistics process to the sleep state or the suspended state and execute S103. The refresh period is 1 month in this method embodiment, but is not limited to 1 month in an actual application.

S103. Correspondingly activate each function of the communication terminal in the duration of frequent use of each function.

Specifically, the short message function is used for description. As shown in Table 1, three periods of most frequent use of the short message function, which are selected according to an average of statistical results, are 10:00-12:00, 16:00-18:00 and 18:00-20:00; therefore, the short message function is activated in these three time periods.

Similarly, the periods of frequent use of the telephone function, which are acquired by adopting the foregoing method, are 8:00-10:00, 16:00-18:00 and 18:00-20:00; therefore, the telephone function is activated in these three time periods.

Because the short message function and the telephone function are both related to a DRX frequency and the number of times for monitoring paging channel, usage of functions related to the short message function and the telephone function can be temporarily reduced in periods of infrequent use of the short message function and the telephone function, that is, 0:00-8:00, 10:00-16:00 and 20:00-0:00, for example, reducing the DRX frequency and reducing the number of times for monitoring paging channel. Apparently, in this way, the power consumption of the communication terminal can be reduced, and the standby time can be prolonged.

It should be noted that the short message function and the telephone function are used in description of the method provided by this embodiment, and apparently the method is also applicable to any other function of the communication terminal, and the communication terminal may be a mobile phone, a personal handy-phone system or a cordless telephone. Preferably, the communication terminal in this embodiment is a smart phone.

In the power saving method provided by the embodiment of the present invention, use time of each function of a communication terminal in one sampling cycle is acquired; a statistical algorithm is executed on the use time of each function to separately obtain a duration of frequent use of each function of the communication terminal in the sampling cycle; and each function of the communication terminal is correspondingly activated in the duration of frequent use of each function. In this way, the communication terminal activates each corresponding function only in the duration of frequent use of each function, thereby reducing the number of wakeup times of the communication terminal in a standby state, reducing power consumption of the communication terminal, and prolonging standby time.

Preferably, mode classification may be automatically implemented for the communication terminal in periods of infrequent use of the short message function, the telephone function, the communication terminal screen off function, the web search function, the power detection function and the data service function, and power saving optimization is performed in the periods of infrequent use according to different modes. The specific method is as follows:

When the communication terminal is not in a duration of frequent use of the short message function and also not in a duration of frequent use of the telephone function, the communication terminal is in a shallow optimization mode. In this case, the communication terminal reduces the DRX frequency related to the short message function and the telephone function, and reduces the number of times for monitoring paging channel.

Exemplarily, time periods of 0:00-8:00, 10:00-16:00 and 20:00-0:00 acquired by adopting the foregoing method are time periods when the communication terminal is not in the duration of frequent use of the short message function and also not in the duration of frequent use of the telephone function, that is, the communication terminal is in a shallow optimization mode. In this case, the communication terminal reduces the DRX frequency related to the short message function and the telephone function, and reduces the number of times for monitoring paging channel.

When the communication terminal is in a time period when it is in the shallow optimization mode and always camps on a same serving cell, the communication terminal is in a moderate optimization mode. In this case, the communication terminal deactivates the web search function and the power detection function for a neighboring cell.

Exemplarily, when the communication terminal is in the shallow optimization mode and detects that a duration for which it camps on a same serving cell exceeds 5 minutes, the communication terminal is in the moderate optimization mode. In this case, the communication terminal deactivates the web search function and the power detection function for the neighboring cell.

When the communication terminal is in a time period where it is in the moderate optimization mode and screen off time exceeds 30 minutes, the communication terminal is in a deep optimization mode. In this case, the communication terminal deactivates a data service to disable frequent network interaction.

In this way, a mode is used to automatically disconnect a network connection, which reduces data service traffic and the number of heartbeats; and moreover, the web search function for a neighboring cell is correspondingly deactivated, which reduces unnecessary cell reselection, reduces the power consumption of the communication terminal, and prolongs the standby time.

It should be noted that the short message function, the telephone function, the communication terminal screen off function, the web search function, the power detection function and the data service function are used in description of the method, and in an actual application, functions of the communication terminal are not limited to these functions; and moreover, the communication terminal may be a mobile phone, a personal handy-phone system or a cordless telephone. Preferably, the communication terminal in this embodiment is a smart phone.

Further, after the communication terminal is in the shallow optimization mode, if the short message function or the telephone function is used again, the DRX frequency and the number of times for monitoring paging channel are restored to normal.

Likewise, after the communication terminal is in the moderate optimization mode, when the communication terminal changes a serving cell, the web search function and the power detection function for a neighboring cell are restored to normal, and the communication terminal returns to the shallow optimization mode; and when the short message function or the telephone function is used again, the DRX frequency and the number of times for monitoring paging channel are restored.

After the communication terminal is in the deep optimization mode, when a screen is turned on again, the data service is restored to normal, and the communication terminal returns to the moderate optimization mode; when the communication terminal changes a serving cell, the web search function and the power detection function for a neighboring cell are restored to normal, and the communication terminal returns to the shallow optimization mode; and when the short message function or the telephone function is used again, the DRX frequency and the number of times for monitoring paging channel are restored to normal.

In this way, the power consumption of the communication terminal can be reduced, and normal operation of the communication terminal is not affected.

Embodiment 2

Figure 3:
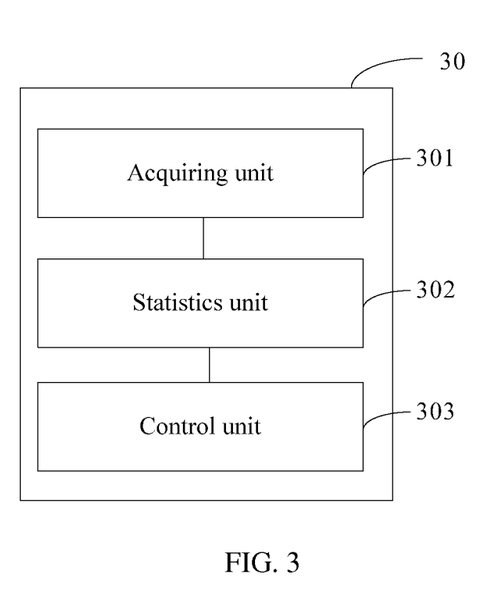
FIG. 3 is a schematic structural diagram of a power saving apparatus according to Embodiment 2 of the present invention.

As shown in FIG. 3, the embodiment of the present invention provides a power saving apparatus 30, where the apparatus includes: an acquiring unit 301, a statistics unit 302, and a control unit 303.

The acquiring unit 301 is configured to acquire use time of each function of a communication terminal in one sampling cycle.

Specifically, functions of the communication terminal include a short message function, a telephone function, a communication terminal screen off function, a web search function, a power detection function, and a data service function. The data service function refers to an Internet access function, a mailbox function, a video function, and a GPRS function. It should be noted that these functions are used in description of this embodiment, but functions of the communication terminal are not limited to these functions in an actual application. Further, the sampling cycle may be 10 to 60 days, and preferably, 30 days.

The statistics unit 302 is configured to execute a statistical algorithm on the use time of each function of the communication terminal to separately obtain a duration of frequent use of each function of the communication terminal in the sampling cycle.

The control unit 303 is configured to correspondingly activate each function of the communication terminal in the duration of frequent use of each function.

In this way, the communication terminal can perform sampling on the use time of each function of the communication terminal according to a user habit to acquire the duration of frequent use of each function, so as to correspondingly activate each function of the communication terminal, identify functions that are not used or less likely used through analysis, and deactivate each function correspondingly. Apparently, the power consumption of the communication terminal can be reduced, and the standby time of the communication terminal can be prolonged.

Figure 4:
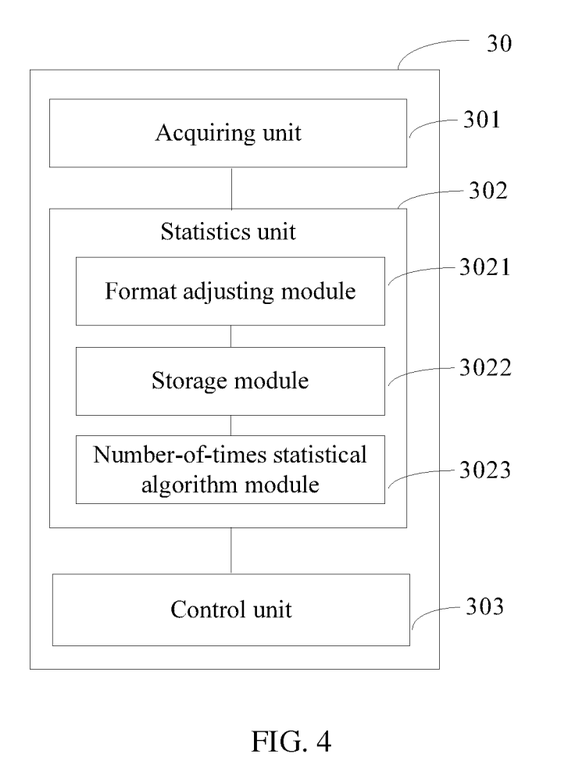
FIG. 4 is a schematic structural diagram of another power saving apparatus according to Embodiment 2 of the present invention.

Further, as shown in FIG. 4, the statistics unit 302 further includes: a format adjusting module 3021 configured to perform format adjustment on the use time of each function of the communication terminal; a storage module 3022 configured to extract sketch values from time data with a same format and separately store use time data with a same sketch value in a corresponding sample space, where the sketch value is used to identify each function of the communication terminal; and a number-of-times statistical algorithm module 3023 configured to execute a number-of-times statistical algorithm on the time data stored in the sample space.

The power saving apparatus provided by the embodiment of the present invention acquires use time of each function of a communication terminal in one sampling cycle, executes a statistical algorithm on the use time of each function to separately obtain a duration of frequent use of each function of the communication terminal in the sampling cycle, and correspondingly activates each function of the communication terminal in the duration of frequent use. In this way, the communication terminal activates each corresponding function only in the duration of frequent use of each function, thereby reducing the number of wakeup times of the communication terminal in a standby state, reducing power consumption of the communication terminal, and prolonging standby time.

Figure 5:
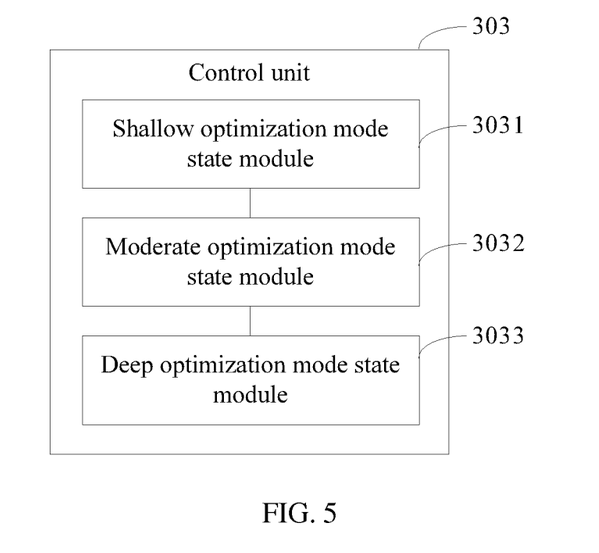
FIG. 5 is a structural schematic diagram of a control unit according to Embodiment 2 of the present invention.

Preferably, mode classification may be automatically performed for states of the communication terminal in periods of infrequent use of the short message function, the telephone function, the communication terminal screen off function, the web search function, the power detection function and the data service function, and standby work related to the duration of infrequent use may be temporarily deactivated in the period states of infrequent use according to different modes. As shown in FIG. 5, the control unit 303 may further include: a shallow optimization mode module 3031 configured to reduce a DRX frequency and reduce the number of times for monitoring paging channel when the communication terminal is in a shallow optimization mode, where the shallow optimization state refers to a state in which the communication terminal is not in a duration of frequent use of the short message function and is also not in a duration of frequent use of the telephone function; a moderate optimization mode module 3032 configured to deactivate the web search function and the power detection function for a neighboring cell when the communication terminal is in a moderate optimization mode, where the moderate optimization mode refers to a state in which the communication terminal is in the shallow optimization mode and always camps on a same serving cell; and a deep optimization mode module 3033 configured to deactivate the data service to disable frequent network interaction when the communication terminal is in a deep optimization mode, where the deep optimization mode refers to a state in which the communication terminal is in the moderate optimization mode and screen off time exceeds 30 minutes.

In this way, a mode is used to automatically disconnect a network connection, which reduces data service traffic and the number of heartbeats; and moreover, the web search function for a neighboring cell is correspondingly deactivated, which reduces unnecessary cell reselection, reduces the power consumption of the communication terminal, and prolongs the standby time.

The shallow optimization mode module 3031 is further configured to restore the DRX frequency and the number of times for monitoring paging channel to normal if the short message function or the telephone function is used again after the communication terminal is in the shallow optimization mode.

The moderate optimization mode module 3032 is further configured to, after the communication terminal is in the moderate optimization mode, when the communication terminal changes a serving cell, restore the web search function and the power detection function for a neighboring cell, where the communication terminal returns to the shallow optimization mode; and restore the DRX frequency and the number of times for monitoring paging channel when the short message function or the telephone function is used again.

The deep optimization mode module 3033 is further configured to, after the communication terminal is in the deep optimization mode, when a screen is turned on again, restore the data service, so that the communication terminal returns to the moderate optimization mode; restore the web search function and the power detection function for a neighboring cell when the communication terminal changes a serving cell, where the communication terminal returns to the shallow optimization mode; and restore the DRX frequency and the number of times for monitoring paging channel when the short message function or the telephone function is used again.

In this way, the power consumption of the communication terminal can be reduced, and normal operation of the communication terminal is not affected.

Embodiment 3

A communication terminal provided by the embodiment of the present invention includes a power supply module, a storage, a CPU, an I/O processing module, a radio frequency module, an application program module, and a power saving apparatus, where the power saving apparatus is specifically configured to acquire use time of each functional module in the application program module of the communication terminal in one sampling cycle, execute a statistical algorithm on the use time of each functional module of the communication terminal to separately obtain a duration of frequent use of each function of the communication terminal in the sampling cycle, and correspondingly activate each function of the communication terminal in the duration of frequent use of each function.

Specifically, the application program module includes a short message function module, a telephone function module, a web search function module, a power detection function module and a communication terminal screen off function module.

In this way, the communication terminal provided by the embodiment of the present invention activates each corresponding function only in a duration of frequent use of each functional module in the application program module, thereby reducing the number of wakeup times of the communication terminal in a standby state, reducing power consumption of the communication terminal, and prolonging standby time.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power saving method, comprising:
   acquiring use time of each function of a communication terminal in one sampling cycle;
   executing a statistical algorithm on the use time of each function of the communication terminal to separately obtain a duration of frequent use of each function of the communication terminal in the sampling cycle;
   automatically setting deactivating and activating actions for each function of the communication terminal based on the duration of frequent use; and
   correspondingly activating each function of the communication terminal in the duration of frequent use of each function.

2. The power saving method according to claim 1, wherein functions of the communication terminal comprise a short message function, a telephone function, a communication terminal screen off function, a web search function, a power detection function, and a data service function.

3. The power saving method according to claim 2, wherein when the communication terminal is in a shallow optimization mode, the communication terminal reduces a discontinuous reception (DRX) frequency and reduces the number of times for monitoring paging channel, and wherein the shallow optimization mode refers to a state in which the communication terminal is not in a duration of frequent use of the short message function and is also not in a duration of frequent use of the telephone function.

4. The power saving method according to claim 3, wherein when the communication terminal is in a moderate optimization mode, the communication terminal deactivates the web search function and the power detection function for a neighboring cell, wherein the moderate optimization mode refers to a state in which the communication terminal is in the shallow optimization mode and always camps on a same serving cell.

5. The power saving method according to claim 4, wherein when the communication terminal is in a deep optimization mode, the communication terminal deactivates a data service to disable frequent network interaction, wherein the deep optimization mode refers to a state in which the communication terminal is the moderate optimization mode and screen off time exceeds 30 minutes.

6. The power saving method according to claim 3, wherein after the communication terminal is in the shallow optimization mode, when the short message function or the telephone function is used again, the DRX frequency and the number of times for monitoring paging channel are restored to normal.

7. The power saving method according to claim 4, wherein after the communication terminal is in the moderate optimization mode, when the communication terminal changes a serving cell, the web search function and the power detection function for a neighboring cell are restored to normal, and the communication terminal returns to the shallow optimization mode, and wherein when the short message function or the telephone function is used again, the DRX frequency and the number of times for monitoring paging channel are restored to normal.

8. The power saving method according to claim 5, wherein after the communication terminal is in the deep optimization mode, when a screen is turned on again, the data service is restored to normal, and the communication terminal returns to the moderate optimization mode, wherein when the communication terminal changes a serving cell, the web search function and the power detection function for a neighboring cell are restored to normal, and the communication terminal returns to the shallow optimization mode, and wherein when the short message function or the telephone function is used again, the DRX frequency and the number of times for monitoring paging channel are restored to normal.

9. The power saving method according to claim 1, wherein executing the statistical algorithm on the use time of each function of the communication terminal specifically comprises:
   performing format adjustment on the use time of each function of the communication terminal to acquire time data with a same format;
   extracting sketch values from the time data with the same format and separately storing the time data with a same sketch value in a corresponding sample space, wherein the sketch value is used to identify each function of the communication terminal; and
   executing a number-of-times statistical algorithm on the time data stored in the sample space to obtain a duration of frequent use of each function of the communication terminal in the cycle.

10. A power saving apparatus, comprising:
    an acquiring unit configured to acquire use time of each function of a communication terminal in one sampling cycle;
    a statistics unit configured to execute a statistical algorithm on the use time of each function of the communication terminal to separately obtain a duration of frequent use of each function of the communication terminal in the sampling cycle; and a control unit configured to correspondingly activate each function of the communication terminal in the duration of frequent use of each function wherein the control unit sets deactivating and activating actions for each function of the communication terminal based on the duration of frequent use.

11. The power saving apparatus according to claim 10, wherein functions of the communication terminal comprise a short message function, a telephone function, a communication terminal screen off function, a web search function, a power detection function, and a data service function.

12. The power saving apparatus according to claim 11, wherein the control unit is specifically configured to, when the communication terminal is in a shallow optimization mode, reduce a discontinuous reception (DRX) frequency and reduce the number of times for monitoring paging channel, wherein the shallow optimization mode refers to a state in which the communication terminal is not in a duration of frequent use of the short message function and is also not in a duration of frequent use of the telephone function.

13. The power saving apparatus according to claim 12, wherein the control unit is further configured to, when the communication terminal is in a moderate optimization mode, deactivate the web search function and the power detection function for a neighboring cell, wherein the moderate optimization mode refers to a state in which the communication terminal is in the shallow optimization mode and always camps on a same serving cell.

14. The power saving apparatus according to claim 13, wherein the control unit is further configured to, when the communication terminal is in a deep optimization mode, deactivate a data service to disable frequent network interaction, wherein the deep optimization mode refers to a state in which the communication terminal is in the moderate optimization mode and screen off time exceeds 30 minutes.

15. The power saving apparatus according to claim 12, wherein the control unit is further configured to, after the communication terminal is in the shallow optimization mode, when the short message function or the telephone function is used again, restore the DRX frequency and the number of times for monitoring paging channel.

16. The power saving apparatus according to claim 13, wherein the control unit is further configured to, after the communication terminal is in the moderate optimization mode, when the communication terminal changes a serving cell, restore the web search function and the power detection function for a neighboring cell, wherein the communication terminal returns to the shallow optimization mode, and wherein when the short message function or the telephone function is used again, restore the DRX frequency and the number of times for monitoring paging channel.

17. The power saving apparatus according to claim 14, wherein the control unit is further configured to, after the communication terminal is in the deep optimization mode, when a screen is turned on again, restore the data service, wherein the communication terminal returns to the moderate optimization mode, wherein when the communication terminal changes a serving cell, restore the web search function and the power detection function for a neighboring cell, wherein the communication terminal returns to the shallow optimization mode, and wherein when the short message function or the telephone function is used again, restore the DRX frequency and the number of times for monitoring paging channel to normal.

18. The power saving apparatus according to claim 10, wherein the statistics unit comprises:

a format adjusting module configured to perform format adjustment for use time of each function of the communication terminal to acquire time data with a same format;

a storage module configured to extract sketch values from the time data with the same format and separately store use time data with a same sketch value in a corresponding sample space, wherein the sketch value is used to identify each function of the communication terminal; and a number-of-times statistical algorithm module configured to execute a number-of-times statistical algorithm on the time data stored in the sample space to obtain a duration of frequent use of each function of the communication terminal in the cycle.

19. A communication terminal, comprising:
a power supply module;
a storage;
a central processing unit (CPU);
an input/output (I/O) processing module;
a radio frequency module;
an application program module; and
a power saving apparatus,
wherein the power saving apparatus is specifically configured to:

acquire use time of each functional module in the application program module of the communication terminal in one sampling cycle;

execute a statistical algorithm on the use time of each functional module of the communication terminal to separately obtain a duration of frequent use of each function of the communication terminal in the sampling cycle;

automatically set deactivating and activating actions for each function of the communication terminal based on the duration of frequent use and correspondingly activate each function of the communication terminal in the duration of frequent use of each function.

20. The communication terminal according to claim 19, wherein the application program module comprises a short message function module, a telephone function module, a web search function module, a power detection function module and a communication terminal screen off function module.

* * * * *

UNITED STATES PATENT AND TRADEMARK OFFICE
CERTIFICATE OF CORRECTION

PATENT NO. : 9,220,068 B2
APPLICATION NO. : 14/311064
DATED : December 22, 2015
INVENTOR(S) : Yu Deng Page 1 of 1

It is certified that error appears in the above-identified patent and that said Letters Patent is hereby corrected as shown below:

Title Page

Foreign Application Priority Data section should read:

Dec. 23, 2011   (CN) ........................... 201110437642.4

References Cited, Other Publications section should read:

"3rd Generation Partnership Project; Technical Specification Group Radio Access Network; User Equipment (UE) procedures in idle mode and procedures for cell reselection in connected mode." Release 10. 3GPP TS 25.304, V10.1.0, Jun. 2011, 52 pages.

Claims

Column 11, Claim 10, Line 6 should read:

A power saving apparatus, comprising:
    an acquiring unit configured to acquire use time of each function of a communication terminal in one sampling cycle;
    a statistics unit configured to execute a statistical algorithm on the use time of each function of the communication terminal to separately obtain a duration of frequent use of each function of the communication terminal in the sampling cycle; and
    a control unit configured to correspondingly activate each function of the communication terminal in the duration of frequent use of each function,
wherein the control unit sets deactivating and activating actions for each function of the communication terminal based on the duration of frequent use.

Signed and Sealed this
Twenty-sixth Day of July, 2016

Michelle K. Lee
*Director of the United States Patent and Trademark Office*